Patented Mar. 2, 1943

2,312,499

UNITED STATES PATENT OFFICE 2,312,499

PLANOGRAPHIC PRINTING FORM

Friedrich Lierg, Vienna, Germany; vested in the Alien Property Custodian

No Drawing. Application April 19, 1939, Serial No. 268,832. In Germany May 7, 1938

28 Claims. (Cl. 95—5.4)

This invention is directed to planographic printing forms or bases and a process of preparing the same.

It has already been suggested that triacetyl cellulose films and triacetyl cellulose layers arranged on sheet metal should be used in preparing printing forms or bases, by saponifying the surface of these films or lacquer layers, thereby making them susceptible to aqueous chromate solutions or dilute colloid solutions containing chromate. After impregnation with the chromate solution, such cellulose hydrate layer superficially formed by the saponification of the film surface has a behavior similar to a chromate sensitized gelatin layer. Upon exposure, the places affected by the light lose their capacity for taking up water and thereby become able to retain fatty inks, while the inks are repelled at the non-exposed or non-affected points. However, in practice it has been found that the chromate sensitized cellulose hydrate layer is not as intensely tanned at the exposed points as are chromate sensitized gelatin or albumin layers. For this reason, after a few prints are made, the moisture breaks through the tanned parts of the acetylcellulose hydrate layer with the result that these parts rapidly lose their ability to hold the oily or greasy ink.

Various patents disclose attempts to waterproof the surface of chromate sensitized films and thus make more permanent their capacity for holding oily or fatty printing colors at the exposed points. Such attempts have included the impregnation of water or alkali soluble artificial resins or resin gelatin emulsions into the film surface.

The fact that the cellulose hydrate layers are not as tannable as the albuminous layers is not due solely to their higher capacity for absorbing water as compared with the latter and therefore cannot be materially improved merely by the use of the above mentioned materials which diminish the water absorption. In this connection the different colloidal character of the cellulose hydrate as compared with the albumin is of more importance. It is known that the tanning effect of chromic acid under the light influence, or of the bleacher used for bromoil printing, depends upon the formation of a secondary product, namely, the chromichromohydrogel, which chromic acid decomposition product coagulates or tans, as a positive polar colloid, the negative polar albuminum. Because of its many hydroxyl groups, the cellulose hydrate has a much stronger negative polar characteristic than gelatin and therefore is much less tanned by the above mentioned positive polar decomposition product of the chromic acid.

It has now been found that the acetyl cellulose has a capacity for water absorption which varies with its acetic acid content, such capacity increasing with the degree of decomposition and the accompanying increase of the constituent hydroxyl groups of the acetyl cellulose. Therefore, if the triacetyl cellulose is decomposed or saponified down to its final decomposition product, namely, the cellulose hydrate, which is identical with Cellophane and with the products of the surface saponification of the above mentioned patented methods, the capacity for water absorption increases from about zero to more than half of its own weight. On the other hand, the capacity for tanning decreases with the increase in the number of the hydroxyl groups present and thus also with the increase in strength of the negative polar characteristic of the particular acetyl cellulose.

Within the above mentioned range of different capacities for water absorption and tanning, exactly that decomposition stage of the acetylcellulose which has the best ability for the formation of a graphical wet printing matrix by a tanning process, is chosen in accordance with the present invention.

A particularly suitable acetyl cellulose is, for instnce, one having an acetyl content of 37 per cent manufactured in the following manner:

100 grams acetyl cellulose of 50.3% acetyl content are added to an acetone-water mixture of 4 parts acetone and 1 part water to form a 10% solution. Into this 1000 cc. acetyl cellulose solution there is slowly added with stirring 100 cc. water. 65 cc. caustic soda solution, of such strength that 1 cc. of the solution is equivalent to 0.2 gram of acetic acid, are then introduced in a thin stream with constant stirring of the solution.

This alkaline decomposition method has the greater advantage, in comparison with the existing decomposition methods, that the decomposition by means of caustic soda or lye takes place quantitatively. Thus the desired acetyl content is obtainable exactly according to the calculated caustic addition. The alkaline decomposition on the whole is of essential importance in the final result of this method for the following reason: In all acid decomposition methods, the cellulose molecule itself is highly affected, and if the decomposition process is carried too far the cellulose is increasingly depolymerized into starchlike compounds. In the alkaline decomposition, the attack is practically limited to the ester groups. If the decomposition is carried out by the usual and known methods, the film layer in which the acetyl cellulose has been rather considerably decomposed, as is necessary to obtain a graphical wet printing matrix, has only a very small strength, whereas a film layer of an acetyl cellulose which has been decomposed by means of an alkali to the same low acetyl number retains practically unchanged its high resistance to tearing. Due to the stresses to which the film surface is subjected both during the rolling in of the printing color as well as during the removal of the fatty printing picture, this high strength is naturally of essential importance for the practical usefulness of the film as a graphical printing matrix in general, and is particularly determinative of the printing speed and the number of copies obtainable.

Naturally, in the same manner as in the case of the acetyl cellulose given as an example, other cellulose esters, ethers or the like colloids, with variable contents of hydroxyl groups and predetermined capacities for water absorption and tanning, may be manufactured by known methods involving chemical synthesis or decomposition, and thus may be prepared within the scope of the present method for the manufacture of planographic printing forms.

Although I have given about 37 percent as the preferred acetyl content of the cellulose acetate, the acid content of the preferred cellulose material will vary depending upon the origin of the acetyl cellulose, the decomposition method used, and the nature of the additional substances referred to hereinafter which are employed for influencing the behavior of the final film. This is also true with respect to the other colloidal cellulose derivatives, such as cellulose ethers, which may be used. The optimum point can be easily determined by simple test and the alkaline decomposition method permits the manufacture of printing forms with such exact optimum values.

These colloids, like the acetyl cellulose decomposed in the manner described above, not only have that ability for water absorption which makes them useful as graphical wet printing materials, but are also soluble products so that they may be easily cast into thin layers upon film, metal, or similar bases.

Because it is both soluble and castable, the present material as compared with the wet printing forms which are obtained by surface saponification of cellulose acetate films, has the further great advantage that modifying substances can be added in exactly calculated amounts to the solutions prior to casting. Such substances, as for instance glycerine, sugar or the like, contribute to the porosity and to the water absorption capacity. Other substances, as will be described hereinafter, will facilitate and increase the retention of the fatty ink or color due to the chemical activity at the tanned parts of the picture.

The colloid layer, which has been given the desired optimum capacity for tanning and water absorption by the above-described method and has been poured or cast upon a support, may now be sensitized in a well-known manner by impregnation with a light sensitive chromate solution for the preparation of flat- and offset-printing forms. After exposure and moistening at the exposed places, these colloids show a remarkably ability to retain fatty or oily color which does not deteriorate in any way even upon permanent moistening. This tanning effect, which causes retention of fatty inks in an image-like distribution, may also be obtained through the use of silver halides due to their tanning and bleaching in a manner similar to that of the bromoil process. Since the tanning through the intermediary of the silver image is less effective than the tanning by the direct exposure of chromate sensitized colloidal layers, it is advantageous in this case to assist the tanning effect by addition of such substances to the colloid as will increase the fatty ink holding character of the tanned image portions, particularly by forming chemically active secondary products as will now be explained.

Chemical substances such as casein, tannic acid, or like organic or even inorganic substances, which form insoluble basic compounds with metal hydroxides, have proved effective as such additional substances. Just as these substances react with metal hydroxides, so they also combine with the reaction products of the tanning bleacher. In other words, the decomposition products of the tanning bleacher, which are formed at the places of the image due to the influence of the light or due to the silver bleaching, form basic chrom- or copper-tannates or caseinates in the presence of tannic acid or casein. These voluminous compounds precipitated at the image points, on the one hand, act as pore-clogging substances and, therefore, water-repelling and, on the other hand, because of their basic character they exert a chemical attractive force upon the fatty ink due to the acid content of the latter. Thus by increasing the acid constituents of the fatty printing ink, such as by increasing the amount of acid varnish or adding acid resins, the adhesion of the fatty printing ink may be further increased.

Instead of making such additions to the colloid layer, the precipitation of such pore-clogging products, and especially of the basic secondary products, may also be obtained at the places of the silver image by the use of a tanning bleacher of a particular composition, and according to the invention this is caused by adding basic agents to the bleacher.

The composition of a bleacher of such activity is, for example, as follows: Equal parts of a 10% copper sulphate solution, a 10% potassium bromide solution, and a 1% chromic acid solution are mixed with an amount of water equal to the total volume of this mixture and a 10% solution of ammonia is added dropwise as long as the blue green precipitate formed therein can be redissolved in this solution by shaking.

During bleaching of a silver image, this bleacher, in contradistinction to the ordinary bleachers which are purely acid bleachers, deposits a visible yellow filler of a basic copper compound at the bleached silver points. This copper compound causes an extremely increased absorption and adhesion of the fatty printing inks at these points, and, due to this high chemical affinity, it not only has a surface effect but also a penetrating action so that even half-tone images which are not screened have a fully differentiated fatty-ink absorption and allow printing of the fatty printing ink in accordance with the half-tone of the silver image.

The preparation of photographical silver halide emulsions in acetyl cellulose or the like colloids, which are soluble only in organic solvents and which are highly resistant to pressure and friction, has been described in detail in my copending application Ser. No. 194,469, filed March 7, 1938, and an application Ser. No. 244,111, filed December 5, 1938.

According to the first mentioned patent application, this light sensitive silver bromide is obtained in a solid cellulose hydrate layer such as Cellophane or in a cellulose acetate film superficially saponified by alkali treatment, by successive impregnation of a brom-salt and a silver salt into the film under certain predetermined conditions. In the last mentioned application, photographed pourable or castable silver halide acetylcellulose aggregates are prepared by incorporating the silver halide or its components into the acetylcellulose solutions by utilizing the electro-polar characteristics of the carrier colloid and the silver halide, which in statu nascendi is colloidal.

If a silver image made in accordance with the first mentioned application, that is, an image present in a cellulose hydrate layer which is similar to that of the hereinbefore described patented methods and which likewise is obtained by surface saponification of acetylcellulose films, is bleached by means of a bromoil bleacher, the bleached parts do not take up fatty ink because of the very slight tanning of the cellulose hydrate on the one hand and its high capacity for water absorption on the other hand. If, however, a silver image is made from an emulsion prepared in accordance with the second patent application from an acetylcellulose which has been given a predetermined water absorption sufficient for the necessary planographic moistening by the partial removal of the acetyl groups in accordance with the above directions, then the bleached silver image parts formed by treatment with the bromoil bleacher have the ability to hold fatty inks.

By adding to the solution, used for casting the acetylcellulose film, substances, which, as above described, impart to the tanned parts a chemical affinity for fatty ink by formation of secondary products, the capacity for absorbing and retaining the ink may be still further increased. For instance, the addition of small amounts of tannic acid has been found very suitable for increasing the retention of the fatty printing ink at the tanned parts of the picture. A similar increased affinity of the bleached silver image of this emulsion for fatty ink is also obtained by use of a basically treated tanning bleacher according to the recipe already given.

The process involving the image-like tanning of a silver image previously obtained by exposure and development is more reliable and valuable from a practical or technical standpoint than is the method involving the tanning of the chromate sensitized colloid layer by direct light action. In the case of the chromate sensitization method, the correct exposure can be judged only from a study of the final fatty ink picture and any correction of an incorrect exposure is impossible, while with the silver image, the final printed picture may be judged in the developed silver-image stage in all its details due to the fact that this image is transformed by bleaching into exactly the same fatty ink retaining tanned image. Of more importance, however, is the fact that the printed picture which will be obtained by the silver halide process may not only be judged, but also corrected, even previously to the final printing and while still in the silver-image stage by altering or changing the silver-image through treatment with chemicals such as bleaching baths in a well-known manner. Thus, for instance, in screened pictures, the picture gradation may be changed or shifted in a desired or necessary manner by weakening or decreasing the silver screen points. It is also possible to weaken or completely remove selected parts of the picture by hand. If the silver-image treated and corrected in this manner is found acceptable, it is then subjected to the tanning bleaching process to transform the silver-image into an exactly corresponding fatty ink holding printing form by the use of the tanning bleacher of the above kind.

Still other treatments or corrections of the printing matrix can be made prior to its use for printing when silver images in cellulose ester layers capable of taking up water are used as the planographic bases. The cellulose esters, which have a predetermined ability to absorb water due to their preparation, can be still further saponified under the influence of weaker alkalis such as ammonia. As is known, the closer the image parts retain the fatty ink and the more the ink is repelled by the non-tanned picture parts, the sharper and more definite will be the prints. This in turn permits the printing of fine screened pictures.

According to the present invention a particularly well-differentiated character of the tanned and non-tanned parts of the picture with respect to their capacity for repelling and absorbing water will be obtained if the flat printing form, which is tanned through the medium of the silver image and which is finished by rolling in the fatty ink, is first set in color by means of an alkali-fast fatty ink in a picture-like fashion and is thereafter treated in an ammonia bath. By this treatment the parts which are not protected by the fatty ink are saponified to cellulose hydrate, that is, to their highest capacity for water absorption. The printing from this differentiated planographic printing form is then done with normal fatty printing ink.

These planographic and off-set printing forms thus made from acetyl cellulose or similar colloids have an extraordinary resistance against surface injury and machinery wear, since by the present invention the original toughness of the starting material is barely changed even when used as an emulsion film. As compared with the gelatin photo-printing forms which allow only an hourly output of about 500 prints, 5,000 and more prints per hour may be obtained with satisfactory results.

It will thus be understood from the foregoing that my invention in a broad aspect is concerned with the adjustment of the content of hydroxyl groups in the selected cellulose derivative, in such a manner that an optimum proportion of the water absorption on the one hand and of the capacity for tanning on the other hand is obtained. As pointed out above, in any of the cellulose derivatives coming into question as a sheet material for planographic printing bases, such as cellulose esters and cellulose ethers, for example, cellulose butyrate and cellulose benzoate, or mixed cellulose esters, such as, cellulose acetobutyrate and cellulose ether-ester the content of hydroxyl groups in the material governs or determines the capacity for water absorption and the capacity for tanning. In some of the materials, more particularly, in cellulose esters the content of hydroxyl groups must be increased in order to attain the required capacity for water absorption by splitting off a corresponding amount of acid groups therefrom, while in other materials, and more particularly in cellulose ethers, the content of hydroxyl groups must be decreased for this purpose, by a correspondingly advanced etherification, but in any instance, the capacity for tanning is decreased with increasing capacity for water absorption and vice versa. Therefore, I proceed in such a maner that the content of hydroxyl groups in the initial cellulose derivative is decreased or increased, as the case may be, until there is just obtained a sufficient water absorbing power. This critical water absorbing power is defined by the fact that the fatty printing ink is repelled at the respective points of the material which have not been exposed or tanned. It is not advisable to decrease or increase the content of hydroxyl groups in the cellulose derivative substantially beyond this critical point, since this would have the effect of decreased the tannability of the material in an undesirable manner.

In view of the involved nature of the phenomena in question, it is not feasible to arrive at the above mentioned optimum value regarding the content of hydroxyl groups with respect to any particular material by computation, but it is easily possible for one skilled in the art, following the principle hereinbefore pointed out, to find out the optimum value for any particular case by a few simple tests. Thus, for intsance, one may proceed by treating the particular cellulose derivative to obtain three samples presenting two extreme and one intermediate content of hydroxyl groups (in accordance with the figures hereafter stated) which are then sensibilized, exposed and tanned in the manner set forth and treated with a hand-operated ink roller to deposit the fatty ink on the tanned portions only of the printing base. Thus, one of the three sample bases will be found to have a sufficient capacity of retaining ink on the tanned areas and at the same time a sufficient capacity of absorbing water or ink-repelling power on the non-tanned areas. Now, two further samples may be made having a slightly higher and a slightly lower content of hydroxyl groups, respectively, than the respective sample while keeping constant all other factors, whereby it can be found out whether the said hydroxyl content should be increased or decreased. Thus, with a few simple tests the "optimum" value for any particular material can be ascertained, following the teaching according to this invention.

For some of the most important materials, desirable or "optimum" values of the content of hydroxyl groups are stated hereunder, viz:

Cellulose acetate—36 to 38 percent acetyl content.

Cellulose butyrate—about 35 percent butyryl content.

Cellulose acetate plus 3 to 5 percent mannite—40 percent acetyl content.

It will be noted that the figures above mentioned by way of example are only approximative, and the said figures may be narrowed down in accordance with the above mentioned method. Moreover, these optimum values can be varied if the above mentioned admixtures or treatments for increasing the capacity for water absorption and for retaining fatty printing ink are applied. For example, the above mentioned optimum value of 37 percent acetyl content can be increased to 42 percent by the addition of 3 to 5 percent mannite. Also the capacity for retaining fatty printing ink can be improved by the above mentioned steps. In this manner, it is possible to start from a certain optimum content of hydroxyl groups corresponding to a certain capacity for water absorption and tanning and then to further increase the capacity for water absorption of the non-tanned areas and the capacity for retaining fatty printing ink on the tanned areas, whereby the contrasts of the printing base or the differences in the behaviour and properties of the tanned and non-tanned portions can be further increased and the printing base can be made more suitable for the reproduction of very fine screen points and for use in high speed printing machines.

By the special above described method of treating the cellulose material, it is possible to produce any desired content of hydroxyl groups and to predetermine the content of hydroxyl groups by computation in accordance with stoichiometrical methods. For example, the content of hydroxyl groups, i. e., of acetyl, of 37 percent in the above example results as follows:

In order to reduce the acetyl content of an acetyl cellulose having an acetyl content of 50.3% acetyl content down to 37 percent, the difference, i. e., 13.3 percent, must be neutralized. To this end, caustic soda is added. It should be noted, in this connection, that the above mentioned strength of the caustic soda (1 ccm. caustic soda equivalent to 0.2 gram of acetic acid) and the above mentioned proportion of acetone and water in the cellulose ester solution are important for a smooth reaction. Since, as mentioned, the strength of the potash lye has been adjusted, by a titrimetric method, in such a manner that 1 ccm. thereof neutralizes 0.2 gr. of acetic acid, a quantity of 13.3 times 5 ccm.=66.5 ccm. caustic soda must be admixed per 100 grs. acetyl cellulose to obtain an acetyl content of 37 percent.

On the other hand, in order to obtain 42 percent acetyl, the difference would be $$50.3 - 42 = 8.3\%$$

and 8.3×5=41.5 ccm. caustic soda would have to be admixed per 100 grs. acetyl cellulose.

It may be noted, that it is not necessary, in the practice of my invention, to start out from an initial material having an undesirable content of hydroxyl groups, and to treat the cellulose derivative in order to obtain the desired content, but it is also possible to use a material which, due to its manufacturing process or particular treatment during its manufacture or thereafter, possesses already the said desired content of hydroxyl groups.

I claim:

1. The process of manufacturing planographic printing bases for flat and offset printing which comprises casting a film from a dissolved colloid material which is insoluble in water and soluble in an organic solvent and has been treated to obtain that content of hydroxyl groups imparting to the particular colloid the capacity to absorb an amount of water sufficient to repel fatty ink while preserving the tannability of the colloid to such an extent that fatty printing ink is retained at the tanned areas thereof, incorporating a light-sensitive material into said film, and exposing and tanning said light sensitive film.

2. The process of manufacturing photo-mechanical printing forms for flat and offset printing which comprises preparing a solution of a cellulose ester having that content of hydroxyl groups imparting to the cellulose ester a capacity for water absorption sufficient to repel fatty printing ink while maintaining its tannability to such an extent that fatty printing ink is retained on any tanned areas thereof, casting said solution into a film layer, sensitizing said film layer with a light sensitive material, and exposing and tanning said light sensitive film.

3. The process of manufacturing planographic photo-mechanical printing forms which comprises chemically saponifying a water-insoluble cellulose derivative in solution to a partially decomposed derivative having that content of hydroxyl groups imparting to said partially decomposed derivative a capacity to absorb an amount of water sufficient to repel fatty ink while maintaining a capacity for tanning sufficient to retain fatty printing ink on any tanned areas thereof, casting a film from said solution, sensitizing said film, and exposing and tanning said sensitized film.

4. The process of manufacturing planographic printing bases from cellulose esters which comprises preparing a solution of a cellulose ester, deesterifying the cellulose ester by means of added alkali to that content of hydroxyl groups having a resultant optimum value of water absorption and tannability, casting said alkali treated cellulose ester solution into a film layer, and sensitizing said film layer with a light sensitive material, exposing and tanning said light sensitive film layer.

5. The process of manufacturing planographic printing forms capable of being tanned and having a high capacity for water absorption which comprises treating a solution of a cellulose acetate with an amount of an alkaline saponifying agent calculated to produce a cellulose derivative of a predetermined hydroxyl-group content imparting to said derivative a capacity for water absorption sufficient to repel fatty printing ink and a capacity for tanning sufficient to retain fatty printing ink on any tanned areas thereof, casting the solution into a film, impregnating the film with a light sensitive material, and exposing and tanning the impregnated film.

6. In the process of preparing planographic printing bases from a water-insoluble cellulose derivative, the step of chemically treating the cellulose derivative in solution prior to its formation into a film to such higher hydroxyl group content which is optimum for the water absorption and tannable characteristics of the final film.

7. The process of preparing planographic printing forms which comprises chemically decomposing a solution of a cellulose acetate to an acetyl content of about 37 percent by means of an alkali, forming a film from said solution, sensitizing said film, and exposing and tanning the sensitized film.

8. In the process of manufacturing photo-mechanical printing bases which comprises casting a film from a solution of a water-insoluble cellulose derivative and impregnating said film with a light sensitive material, the step of chemically converting a dissolved derivative of cellulose into a cellulose compound having high degrees of water absorption and tannability, and adding to the solution prior to the casting of said film a substance having the property of increasing the porosity and water absorption of the film prepared from said cellulose compound solution.

9. In the process of preparing wet printing forms which comprises casting a film from a solution of a water-insoluble cellulose derivative chemically treated to obtain a hydroxyl group content which is optimum in water absorption and tannability, impregnating said film with a light sensitive material, exposing said film behind a negative and tanning said film at the exposed parts, the step of adding to the solution substances which will form pore-clogging and fatty ink absorbing reaction products at the tanned image points of said film.

10. In the process as claimed in claim 1, wherein the light sensitive material is a silver halide, the step of tanning said film at the points of the silver picture by means of a tanning bleacher.

11. In the process of manufacturing planographic printing bases which comprises casting a film from a solution of a cellulose ester having a hydroxy group content corresponding to an ester group content of from 35 to 38 per cent and capable of imparting maximum combined water absorption and tannability to the cellulose film cast from the solution and sensitizing said film with a silver halide, the step of incorporating into the solution substances which due to their basic character precipitate pore-clogging products under the influence of a silver bleach.

12. In the process of preparing planographic printing forms from partially hydrolyzed water insoluble cellulose derivatives containing a light sensitive silver halide, the step of employing bromoil bleacher comprising a solution of copper sulphate, an alkali bromide and chromic acid and containing sufficient alkali to precipitate pore-clogging basic secondary products at the points of silver bleaching.

13. The process of preparing planographic printing bases which comprises forming a solution of a cellulose ester, partially saponifying the ester to an acetyl content of about 37 percent, casting a film from the saponified ester, impregnating the cast film with a light sensitive silver halide, exposing the light sensitive film, and developing and tanning the exposed film using an alkaline bromoil bleacher comprising a water solution of copper sulphate, potassium bromide, chromic acid and ammonia.

14. In the method for manufacturing planographic printing forms which comprises casting a film layer from a water-insoluble colloid dissolved in an organic solvent which colloid is producible with varying hydroxyl group content and correspondingly differentiated capacity for water absorption and tanning, the step of influencing said colloidal solution synthetically to such content of hydroxyl groups as will impart an optimum value of water absorption and tannability prior to the casting of said film.

15. Method for manufacture of wet printing forms which comprises casting a film from a cellulose organic ester solution having an ester group content of from 35 to 38 per cent, which imparts optimum values of combined tannability and water absorption, sensitizing said film with a silver halide, exposing and developing said sensitized film, treating the silver image with bleaching agents to correct the silver image and finally converting the silver image by the tanning bleaching thereof into a tanned image part.

16. The method of claim 15 including the further step of covering the tanned image parts with an alkali-fast fatty ink and submitting the coated film to the action of an alkali bath to further saponify the uncoated portions of the film surface.

17. A planographic printing plate comprising a layer of a water-insoluble cellulose derivative of such predetermined hydroxyl group content as to give optimum water absorption and tannability throughout the cellulose layer.

18. A planographic printing base comprising a layer of partially hydrolyzed cellulose acetate of such predetermined hydroxyl group content as to give optimum water absorption and tannability throughout the cellulose acetate layer.

19. A planographic printing base in which both the picture and non-picture parts comprise a partially and equally saponified, water-insoluble cellulose ester of such predetermined hydroxyl group content as to give optimum water absorption and tannability throughout the cellulose ester layer.

20. A wet-printing base containing a layer of water-insoluble cellulose derivative characterized by high water absorption and tannability, and a pore-clogging substance, and a light sensitive material incorporated in said layer.

21. A planographic printing base comprising a layer of partially decomposed cellulose derivative having optimum water absorption and tannability and a basic pore-clogging material in said layer.

22. A planographic printing base comprising a layer of partially hydrolyzed cellulose acetate of approximately 37 percent acetyl content, and a metallic casein derivative capable of acting as a pore-clogging and water-repelling substance.

23. A planographic printing plate comprising a layer of a water-insoluble, partially decomposed cellulose derivative of such predetermined hydroxyl group content as to impart to said film a capacity for water absorption sufficient to repel fatty printing ink while having such ester group content as to maintain a capacity for tanning sufficient to retain said fatty printing ink on the tanned areas.

24. The process of manufacturing planographic printing bases for flat and offset printing which comprises casting a film from a dissolved colloid material which is insoluble in water and soluble in an organic solvent and has been treated to obtain that content of hydroxyl groups in said colloid imparting to said film a capacity for water absorption sufficient to repel fatty printing inks while maintaining a capacity for tanning sufficient to retain said fatty printing ink on the tanned areas, incorporating into the film substances capable of increasing its capacity for water absorption beyond that corresponding to the said content of hydroxyl groups, incorporating a light sensitive material into said film, and exposing and tanning said light sensitive film.

25. The process of manufacturing planographic printing bases for flat and offset printing which comprises casting a film from a dissolved colloid material which is insoluble in water and soluble in an organic solvent and has been treated to obtain that content of hydroxyl groups in said colloid imparting to said film a capacity for water absorption sufficient to repel fatty printing ink while maintaining a capacity for tanning sufficient to retain said fatty printing ink on the tanned areas, adding to the film substances capable of increasing its capacity for retaining fatty printing ink on the tanned areas, incorporating a light sensitive material into said film, and exposing and tanning said light sensitive film.

26. The process of manufacturing planographic printing bases for flat and offset printing which comprises casting a film from a dissolved colloid material which is insoluble in water and soluble in an organic solvent and has been treated to obtain that content of hydroxyl groups in said colloid imparting to said film a capacity for water absorption sufficient to repel fatty printing ink while maintaining a capacity for tanning sufficient to retain said fatty printing ink on the tanned areas, incorporating into the film substances for increasing its capacity for water absorption beyond that corresponding to the said content of hydroxyl groups, adding to the film substances for increasing its capacity for retaining fatty printing ink on the tanned areas, incorporating a light sensitive material into said film, and exposing and tanning said light sensitive film.

27. The process of manufacturing planographic printing bases for flat and offset printing which comprises casting a film from a dissolved colloid material which is insoluble in water and soluble in an organic solvent and has been treated to obtain that content of hydroxyl groups in said colloid imparting to said film a capacity for water absorption sufficient to repel fatty printing ink while maintaining a capacity for tanning sufficient to retain said fatty printing ink on the tanned areas, incorporating a light sensitive chromate material into said film, and exposing and tanning said light sensitive film.

28. The process of manufacturing planographic printing bases for flat and offset printing which comprises casting a film from a water-insoluble cellulose derivative dissolved in an organic solvent and treated to obtain that content of hydroxyl groups in said derivative imparting to said film a capacity for water absorption sufficient to repel fatty printing ink while maintaining a capacity for tanning sufficient to retain said fatty printing ink on the tanned areas, incorporating a light sensitive material into said film, and exposing and tanning said light sensitive film.

FRIEDRICH LIERG.